(12) United States Patent
Lockett et al.

(10) Patent No.: US 6,321,567 B1
(45) Date of Patent: Nov. 27, 2001

(54) STRUCTURED PACKING SYSTEM FOR REDUCED DISTILLATION COLUMN HEIGHT

(75) Inventors: Michael James Lockett, Grand Island; John Fredric Billingham, Getzville, both of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/680,207

(22) Filed: Oct. 6, 2000

(51) Int. Cl.[7] .................................................. F25J 3/08
(52) U.S. Cl. ........................................................ 62/643
(58) Field of Search ...................................... 62/643, 906

(56) References Cited

U.S. PATENT DOCUMENTS

| | | | |
|---|---|---|---|
| 5,019,145 | 5/1991 | Rohde | 62/22 |
| 5,100,448 | 3/1992 | Lockett et al. | 62/24 |
| 5,224,351 | 7/1993 | Jeannot et al. | 62/36 |
| 5,419,136 | 5/1995 | McKeigue | 62/24 |
| 5,426,946 | 6/1995 | Corduan et al. | 62/22 |
| 5,613,374 | 3/1997 | Rohde et al. | 62/643 |
| 5,632,934 | 5/1997 | Billingham et al. | 261/112.2 |
| 5,921,109 | 7/1999 | Billingham et al. | 62/643 |
| 6,101,841 | 8/2000 | Billingham et al. | 62/643 |

FOREIGN PATENT DOCUMENTS

WO16247  5/1997  (WO) .............................. B01J/19/32

*Primary Examiner*—Henry Bennett
*Assistant Examiner*—Malik N. Drake
(74) *Attorney, Agent, or Firm*—Stanley Ktorides

(57) ABSTRACT

A system particularly useful for the cryogenic rectification of air to produce product, particularly high purity argon, comprising a structured packing arrangement having a defined moderate area density, a defined sharp corrugation angle and at least one of a defined short brick height and a defined packing structure modification.

11 Claims, 4 Drawing Sheets

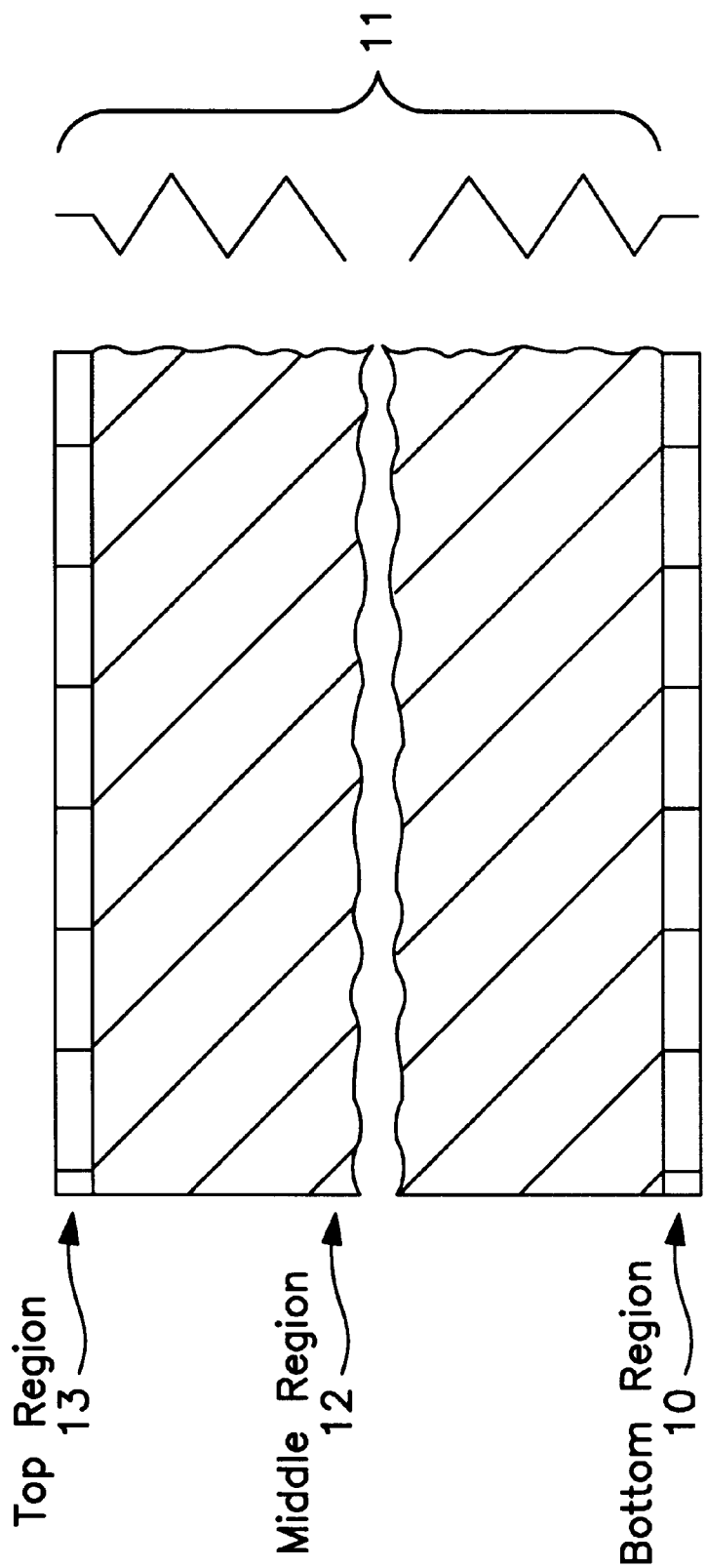

STRUCTURED PACKING SYSTEM FOR REDUCED DISTILLATION COLUMN HEIGHT

TECHNICAL FIELD

This invention relates generally to structured packing for use in distillation columns, and is particularly useful for the production of high purity argon from a single argon column in the operation of a cryogenic air separation plant.

BACKGROUND ART

The large-scale production of oxygen, nitrogen and argon is typically carried out through cryogenic rectification. It has been known for some time that the use of structured packing inside the rectification columns offers distinct advantages over trays, which were the previous column internal of choice. The primary advantage of structured packings is their low pressure drop per theoretical stage of separation. This reduces the operating pressure of the columns, which in turn drops the pressure to which air must be compressed and thus the power requirements for the plant. The use of packing also enables the use of extended argon columns for the production of essentially oxygen-free argon directly from the plant.

Structured packings do have disadvantages over trays. Packed columns are typically more expensive to manufacture than their trayed counterparts. In addition, while the height of packing per theoretical stage may be similar to trayed columns, the additional height required for collection and distribution of liquid means that industrial columns containing commercially available structured packings are taller than trayed columns. Increasing the height of the distillation columns has several drawbacks particularly for air separation. For example, heat leak into the cryogenic system increases as the column package height increases which must be overcome through the generation of additional refrigeration at the expense of power. In addition, liquid transfer from the higher pressure column to the lower pressure column may require liquid pumping or vapor lift if the height of the lower pressure column package is too high, adding complexity and inefficiency to the process. Vapor lift is the term used to describe the combination of a lower density stream, which is normally vapor, with a higher density stream, which is normally liquid, so as to reduce the mean fluid density and thus reduce the hydrostatic head contribution to pressure drop when transporting the stream to a higher elevation.

For these reasons cryogenic air separation plants employ very low tray spacing and low height equivalent of a theoretical plate (HETP) packing when compared to other typical industrial separations in the chemical industry. HETP is a term often used in the characterization of packed distillation columns and is used herein in the general sense that a lower HETP indicates that more mass transfer occurs in a given height of packing.

Crude argon, having an argon concentration of about 98 mole percent(%) or less, is produced by the cryogenic rectification of air. Argon comprises less than 1% of air. Typically air is separated into oxygen and nitrogen by use of a double column system comprising a high pressure column in heat exchange relation with a low pressure column. Argon has a boiling point intermediate to that of nitrogen and oxygen but closer to oxygen and will tend to concentrate in the lower regions of the low pressure column. At or near the point in the low pressure column that the concentration of argon is a maximum, a stream is withdrawn and passed into an argon column for rectification into a crude argon product. The argon concentration in the feed stream is typically 7–15% so that effective argon recovery can be attained by the argon column system. The remainder of the argon column feed stream comprises oxygen and nitrogen.

In the argon column the feed is separated by cryogenic rectification. The less volatile component, oxygen, is stripped from the rising vapor and argon concentrates at the top of the column. Any nitrogen present in the feed to the argon column will also concentrate at the top of the column since nitrogen is more volatile than both argon and oxygen. The crude argon product that leaves the top of the column generally comprises 95–98% argon. The remainder is essentially oxygen and nitrogen. The crude product is sent for further processing to produce high purity or refined argon. Oxygen is removed from the crude argon stream by mixing it with hydrogen and passing the mixture through a catalytic hydrogenation unit where the hydrogen and oxygen react to form water. The stream is then passed through a dryer to remove the water. Alternative methods for the removal of oxygen exist. Once the oxygen has been removed, nitrogen is separated from the argon stream by cryogenic distillation. The resulting high purity or refined argon having an oxygen concentration generally less than 2 ppm and a nitrogen concentration generally less than 2 ppm is now suitable for commercial use.

The capital and operating costs of producing refined argon from the argon column system are considerable. However, it is possible to produce essentially oxygen-free argon directly if sufficient equilibrium stages are provided in the argon column. Typically, the number of equilibrium stages that are provided in an argon column for the production of crude product is 40–50. This number must increase to 150 or higher to meet the oxygen concentration specification by distillation alone.

Production of nearly oxygen-free argon through extension of the argon column has some obvious advantages. Primarily, it does not require additional unit operations downstream, with the associated hardware and control requirements. However, the large number of equilibrium stages involved means that very tall columns are required. Currently, if nearly oxygen-free argon is sought, an additional column is placed in series with the crude column that would be present in a conventional argon producing plant. This second column, referred to as the superstaged column, must generate 100 or so equilibrium stages of separation, the crude column generating about 50. Vapor is taken from the top of the crude column and drawn into the base of the superstaged column. Liquid from the base of the superstaged column is pumped to the top of the crude column. Splitting the column has obvious economic drawbacks and clearly substantial savings could accrue from using a single column to perform the same task. However, the reality is that, with conventional structured packings, the additional expense of splitting the column is justified in view of the costs associated with building and erecting the taller column required if the crude column is to be eliminated.

Accordingly it is an object of this invention to provide a structured packing brick which may be employed in a column so that in operation the column may be used to carry out a given separation with a column height which is less than that which would be required for that separation using conventional structured packing as the column internals.

SUMMARY OF THE INVENTION

The above and other objects, which will become apparent to those skilled in the art upon a reading of this disclosure, are attained by the present invention, one aspect of which is:

A method for operating a rectification column comprising:

(A) passing a feed mixture comprising a more volatile component and a less volatile component into a column, said column containing a height of packing comprising a plurality of bricks, said bricks having an area density greater than 600 m$^2$/m$^3$ and less than 1500 m$^2$/m$^3$ and comprising a plurality of vertically oriented structured packing sheets having a corrugation angle greater than 45 degrees and less than 70 degrees, and said bricks having at least one of (1) a height less than 8 inches, and (2) packing sheets having a lower region which differs in structure from the remaining region of that sheet so that the resistance to vapor flow in the lower region is less than the resistance to vapor flow in the remaining region;

(B) carrying out rectification within the column wherein vapor flows upward through the bricks and liquid flows downward through the bricks whereby the said more volatile component concentrates in the upflowing vapor and the said less volatile component concentrates in the downflowing liquid; and (C) withdrawing first fluid from the upper portion of the column, said first fluid having a concentration of more volatile component which exceeds that of the feed mixture, and withdrawing second fluid from the lower portion of the column, said second fluid having a concentration of less volatile component which exceeds that of the feed mixture.

Another aspect of the invention is:

A column containing a height of packing comprising a plurality of bricks, said bricks having an area density greater than 600 m$^2$/m$^3$ and less than 1500 m$^2$/m$^3$ and comprising a plurality of vertically oriented structured packing sheets having a corrugation angle greater than 45 degrees and less than 70 degrees, and said bricks having at least one of (1) a height less than 8 inches, and (2) packing sheets having a lower region which differs in structure from the remaining region of that sheet so that the resistance to vapor flow in the lower region is less than the resistance to vapor flow in the remaining region.

A further aspect of the invention is:

A brick having an area density greater than 600 $^2$/m$^3$ and less than 1500 m$^2$/m$^3$ and comprising a plurality of vertically oriented structured packing sheets having a corrugation angle greater than 45 degrees and less than 70 degrees, and at least one of (1) a height less than 8 inches, and (2) packing sheets having a lower region which differs in structure from the remaining region of that sheet so that the resistance to vapor flow in the lower region is less than the resistance to vapor flow in the remaining region.

The term "column" as used herein means a distillation or fractionation column or zone, i.e. a contacting column or zone wherein liquid and vapor phases are countercurrently contacted to effect separation of a fluid mixture, as for example, by contacting of the vapor and liquid phases on packing elements. For a further discussion of distillation columns see the Chemical Engineers' Handbook, Fifth Edition, edited by R. H. Perry and C. H. Chilton, McGraw-Hill Book Company, New York, Section 13, "Distillation" B. D. Smith, et al., page 13–3 *The Continuous Distillation Process*. Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Distillation is the separation process whereby heating of a liquid mixture can be used to concentrate the more volatile component(s) in the vapor phase and thereby the less volatile component(s) in the liquid phase. Partial condensation is the separation process whereby cooling of a vapor mixture can be used to concentrate the more volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases can be adiabatic or nonadiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is rectification carried out, at least in part, at temperatures below 150° K.

As used herein, the term "packing" means any solid or hollow body of predetermined configuration, size and shape used as column internals to provide surface area for the liquid to allow mass transfer at the liquid-vapor interface during countercurrent flow of the two phases.

As used herein, the term "structured packing" means diagonally cross-corrugated packing wherein the individual members have specific orientation relative to each other and to the column axis.

As used herein, the terms "upper portion" and "lower portion" of a column mean those sections of the column respectively above and below the mid point of the column.

As used herein, the term "corrugation" means a fold, either a peak or a trough, on a packing sheet.

As used herein, the term "corrugation angle" means the angle of the corrugations of the structured packing with respect to the vertical.

As used herein, the term "area density" means the surface area of the packing per unit volume of the packing.

BRIEF DESCRIPTION OF THE DRAWINGS

FIGS. 4A and 4B show respectively a front face view and a side view of a packing sheet useful in the practice of this invention having a corrugation angle of 65° and having steeper corrugations in both the bottom region and the top region.

DETAILED DESCRIPTION

Figure 2:
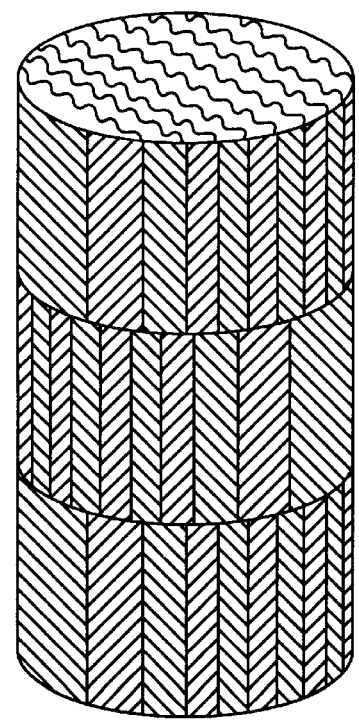
FIG. 2 is a representation of structured packing bricks as they would be stacked within a column.

Cross-corrugated structured packing sheets are formed into bricks or modules. Each brick comprises a plurality of vertically orientated, diagonally cross-corrugated packing sheets. The sheets are stacked, side-by-side, such that the direction of the corrugation is reversed in neighboring sheets. In so doing, the sheets define a plurality of crossing passages through which rising gas can flow. The bricks of packing are installed into a column as layers that fill the cross sectional area of the column. Each layer may be a single brick or, in larger columns, several bricks that when placed side-by-side fit a circular cross-section. These layers are stacked, one on top of the other, to give the required packed height. Adjacent layers are rotated such that the sheets in the bricks comprising the layers are not parallel. The degree of rotation is between 45 and 90 degrees, and more typically 90 degrees. A simplified illustration of stacked bricks is shown in FIG. 2.

It is known that the height of a distillation column such as a cryogenic air separation column may be reduced by using structured packing modules having a high area density. However, high area densities have disadvantages. One disadvantage is higher liquid hold-up. For a given liquid flux the liquid hold-up on the packing increases as the area density of the packing to the power 0.85. High liquid hold-up is particularly a problem in extended argon columns. Argon is a relatively minor constituent of air. Even if every argon molecule entering with the feed air is captured inside the argon column, it requires a period of several hours, and typically more than one day, before the argon column has a complete liquid inventory. Another problem with high area densities is lower capacity. Increasing the specific area reduces the channel dimensions and increases the pressure drop associated with the gas. The column diameter now has to be increased to provide the required flow capacity.

Figure 1:
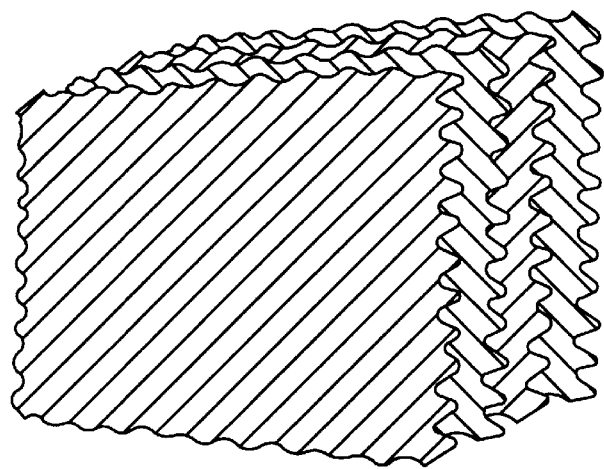
FIG. 1 is a perspective view of one embodiment of structured packing sheets of this invention with the middle region of the sheets having a corrugation angle of about 54 degrees.
Figures 3A, 3B:
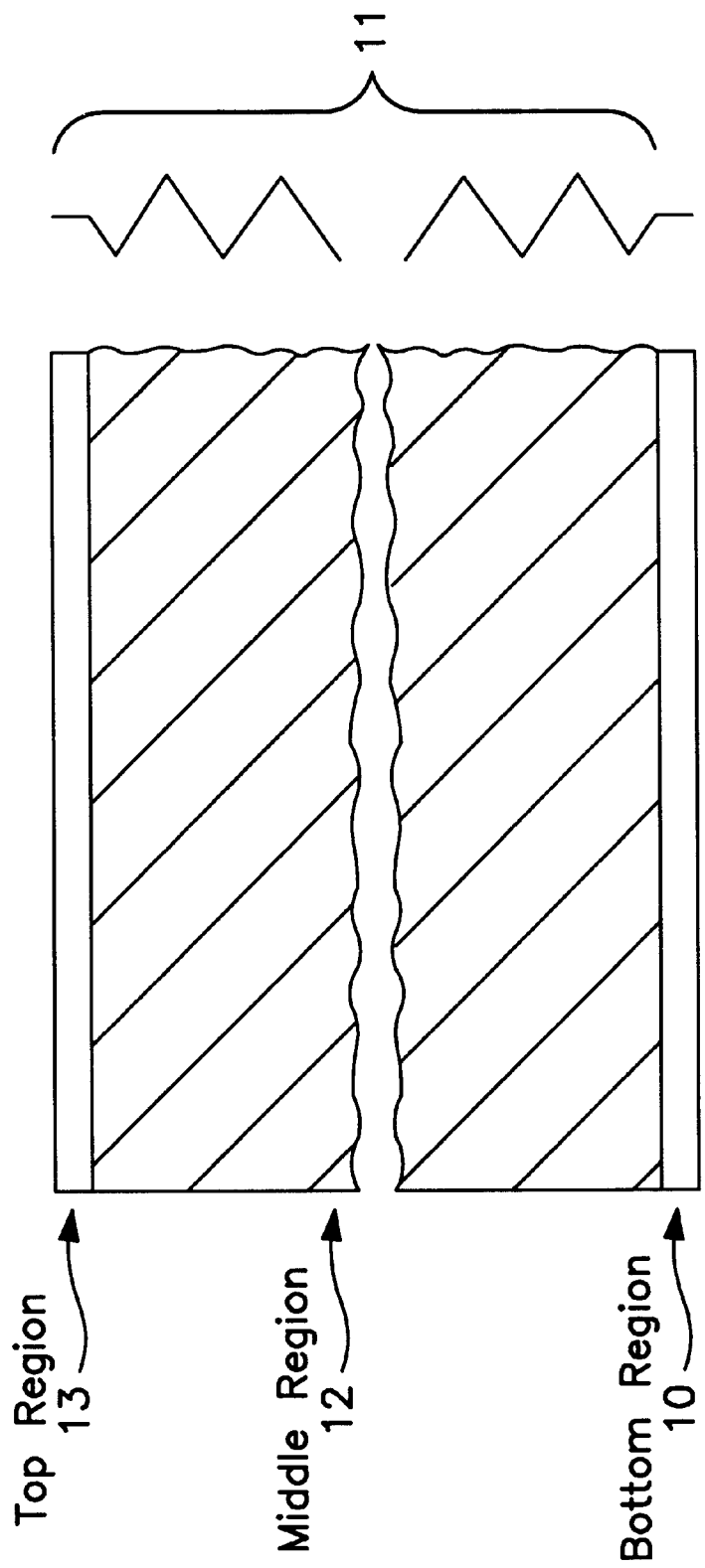
FIGS. 3A and 3B show respectively a front face view and a side view of a packing sheet useful in the practice of this invention having a corrugation angle of 55° and having a flattened crimp in both the bottom region and the top region of the packing sheet.

In the practice of this invention, the structured packing modules have an area density greater than 600 $m^2/m^3$ but less than 1500 $m^2/m^3$ and preferably an area density within the range of from greater than 800 $m^2/m^3$ to less than 1000 $m^2/m^3$. The invention enables the retention of much of the advantage of higher area density structured packing practice while substantially avoiding the disadvantages by employing, in conjunction with the defined area density, structured packing having corrugation angles greater than 45 degrees but less than 70 degrees, and preferably corrugation angles within the range of from 47 to 55 degrees. FIGS. 1, 3A and 4A illustrate structured packing sheets having a corrugation angle defined by the invention.

In one preferred embodiment the invention employs bricks of unconventionally short height of less than 8 inches and preferably less than 6 inches. Generally structured packing sheets have a height of at least 8 inches. The short brick height of this invention provides an increased frequency of mixing of liquid and vapor and more frequent renewal of the liquid films. The important consideration is the degree of mixing per theoretical plate rather than per foot of packing height. Thus, packing having a low HETP should utilize a shorter brick height than packing having a larger HETP. A brick height of less than 8 inches is beneficial for achieving low HETP's. Two or more bricks can be fastened together before installation to facilitate installation.

In another preferred embodiment of the invention the structured packing sheets have a lower region which differs in structure from the remaining portion of that sheet so that when the structured packing sheets are formed into bricks the resistance to vapor flow in the lower region is less than the resistance to vapor flow in the remaining region. This bottom modification serves to offset the capacity reduction that occurs with high area densities. The modification in the structure in the lower region need not be present in each sheet which makes up the brick. Structured packing sheets illustrating the lower region and the remaining region are shown in FIGS. 3A, 3B, 4A and 4B where the lower region 10 may comprise up to the lower 10 percent, preferably up to the lower 5 percent, most preferably up to the lower 2.5 percent of the packing sheet, with the remainder of the packing sheet comprised of remaining region 11. In the packing sheets illustrated in FIGS. 3A, 3B, 4A and 4B there is illustrated a remaining region made up of a middle region 12 and an upper region 13. The upper region may, if desired, have a structure similar to that of the lower region, in which case only the middle region of the remaining region differs in structure from that of the lower region. Examples of suitable structure modifications in the lower region include reduced crimp height, steeper corrugations, and greater fractional open area.

Most preferably the invention employs both bricks having a height less than 8 inches and packing sheets having a lower region which differs in structure from the remaining region of that sheet so that the resistance to vapor flow in the lower region is less than the resistance to vapor flow in the remaining region.

Figure 5:
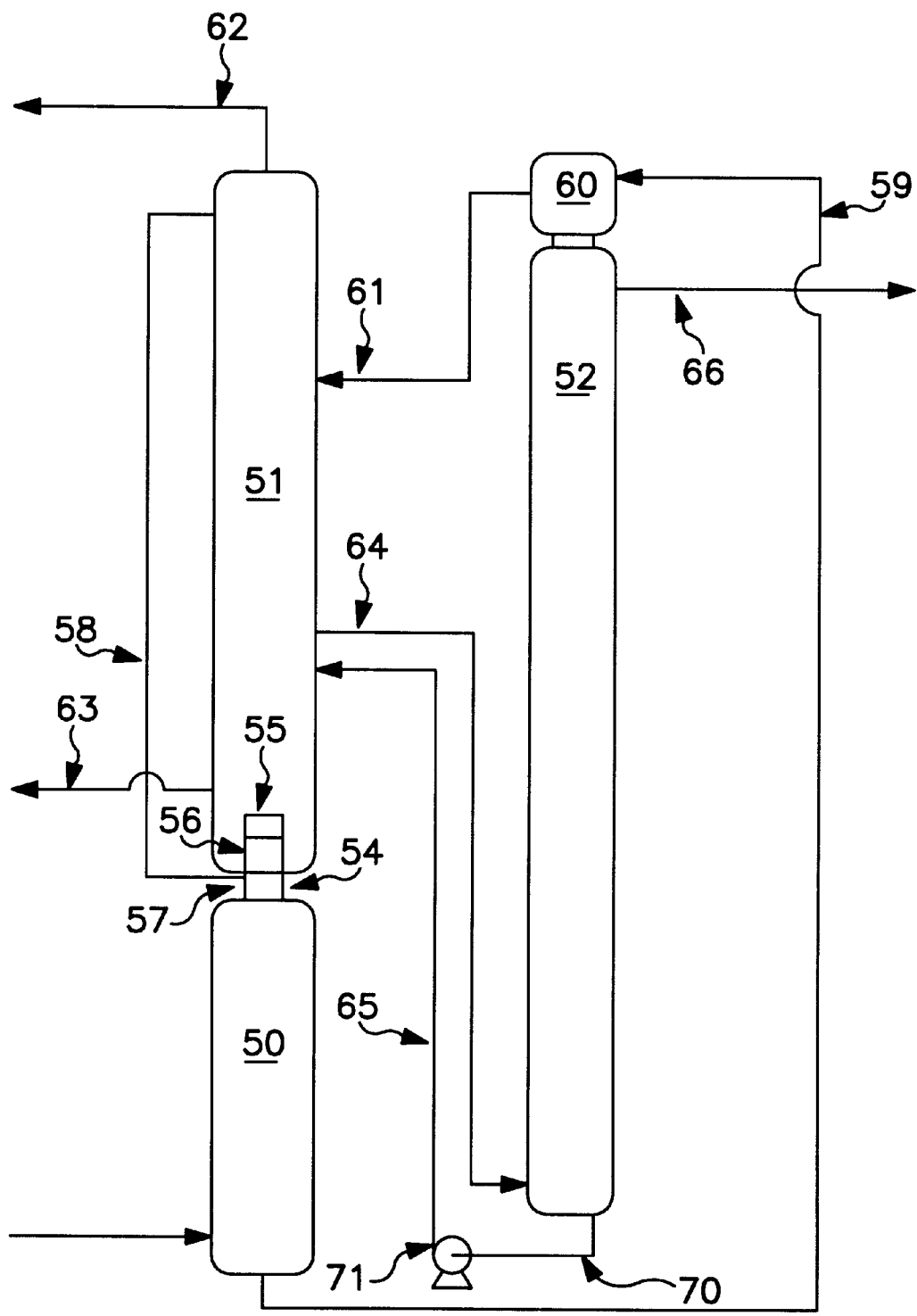
FIG. 5 is a representation of a preferred arrangement for carrying out the method of this invention.

A particularly preferred embodiment of the method of this invention is illustrated in simplified form in FIG. 5. In this system high purity argon is produced in a single column which receives a feed stream from the lower pressure column of a double column cryogenic air separation plant. The structured packing modules of this invention may be employed throughout the argon column or in only a portion of the argon column instead of its entirety. The modules may also be employed in the whole or in a part of the lower pressure column and/or the higher pressure column.

Referring now to FIG. 5, feed air 53 is passed into higher pressure column 50 wherein it is separated by cryogenic rectification into nitrogen-enriched vapor and oxygen-enriched liquid. Nitrogen-enriched vapor is passed as stream 54 into main condenser 55 wherein it is condensed by indirect heat exchange with lower pressure column 51 bottom liquid. Resulting nitrogen-enriched liquid 56 is passed into column 50 as reflux liquid 57 and into column 51 as reflux liquid 58. Oxygen-enriched liquid is passed in stream 59 into argon condenser 60 wherein it is at least partially vaporized and then passed into column 51 as shown by stream 61. Within column 51 the various feeds are separated by cryogenic rectification into product nitrogen, which is recovered in stream 62, and into product oxygen which is recovered in stream 63. A side stream 64, comprising from about 7 to 20 mole percent argon with the rest primarily oxygen, is passed from column 51 into superstaged argon column 52 wherein it is separated into argon-richer fluid and oxygen-richer fluid. The oxygen-richer fluid is withdrawn from the lower portion of column 52 in stream 70, passed through liquid pump 71 and then passed into column 51 in stream 65. The argon-richer fluid, after being processed in whole or in part in condenser 60, is recovered as high purity argon in stream 66 having an argon concentration of at least 98 mole percent and containing less than 5 ppm oxygen. Generally superstaged argon column 52 will have no more than 180 equilibrium stages, and typically will have from 150 to 180 equilibrium stages.

Although the invention has been described in detail with reference to certain preferred embodiments those skilled in the art will recognize that there are other embodiments of the invention within the spirit and the scope of the claims.

What is claimed is:

1. A method for operating a rectification column comprising:

(A) passing a feed mixture comprising a more volatile component and a less volatile component into a column, said column containing a height of packing comprising a plurality of bricks, said bricks having an area density greater than 600 m²/m³ and less than 1500 m²/m³ and comprising a plurality of vertically oriented structured packing sheets having a corrugation angle greater than 45 degrees and less than 70 degrees, and said bricks having at least one of (1) a height less than 8 inches, and (2) packing sheets having a lower region which differs in structure from the remaining region of that sheet so that the resistance to vapor flow in the lower region is less than the resistance to vapor flow in the remaining region;

(B) carrying out rectification within the column wherein vapor flows upward through the bricks and liquid flows downward through the bricks whereby the said more volatile component concentrates in the upflowing vapor and the said less volatile component concentrates in the downflowing liquid; and (C) withdrawing first fluid from the upper portion of the column, said first fluid having a concentration of more volatile component which exceeds that of the feed mixture, and withdrawing second fluid from the lower portion of the column, said second fluid having a concentration of less volatile component which exceeds that of the feed mixture.

2. The method of claim 1 wherein the rectification is cryogenic rectification and wherein the more volatile component is argon and the less volatile component is oxygen, the feed mixture comprises from 7 to 20 mole percent argon, and the first fluid has an argon concentration of at least 98 mole percent.

3. The method of claim 1 wherein the rectification is cryogenic rectification and wherein the more volatile component is nitrogen and the less volatile component is oxygen.

4. The method of claim 1 wherein said bricks have a height less than 8 inches and at least some of the said packing sheets have a lower region which differs in structure from the remaining region of that sheet so that the resistance to vapor flow in the lower region is less than the resistance to vapor flow in the remaining region.

5. A column containing a height of packing comprising a plurality of bricks, said bricks having an area density greater than 600 m²/m³ and less than 1500 m²/m³ and comprising a plurality of vertically oriented structured packing sheets having a corrugation angle greater than 45 degrees and less than 70 degrees, and said bricks having at least one of (1) a height less than 8 inches, and (2) packing sheets having a lower region which differs in structure from the remaining region of that sheet so that the resistance to vapor flow in the lower region is less than the resistance to vapor flow in the remaining region.

6. The column of claim 5 wherein said bricks have a height less than 8 inches and at least some of the said packing sheets have a lower region which differs in structure from the remaining region of that sheet so that the resistance to vapor flow in the lower region is less than the resistance to vapor flow in the remaining region.

7. A brick having an area density greater than 600 m²/m³ and less than 1500 m²/m³ and comprising a plurality of vertically oriented structured packing sheets having a corrugation angle greater than 45 degrees and less than 70 degrees, and at least one of (1) a height less than 8 inches, and (2) packing sheets having a lower region which differs in structure from the remaining region of that sheet so that the resistance to vapor flow in the lower region is less than the resistance to vapor flow in the remaining region.

8. The brick of claim 7 wherein said packing sheets have a corrugation angle within the range of from 47 to 55 degrees.

9. The brick of claim 7 having an area density within the range of from greater than 800 to less than 1000 m²/m³.

10. The brick of claim 7 having a height less than 6 inches.

11. The brick of claim 7 having a height less than 8 inches and wherein at least some of the said packing sheets have a lower region which differs in structure from the remaining region of that sheet so that the resistance to vapor flow in the lower region is less than the resistance to vapor flow in the remaining region.

* * * * *